June 16, 1953 A. K. ROBINSON ET AL 2,642,534
MULTIPLE STANDARD INVERSION FREQUENCY MEASURING SYSTEM
Filed April 23, 1951
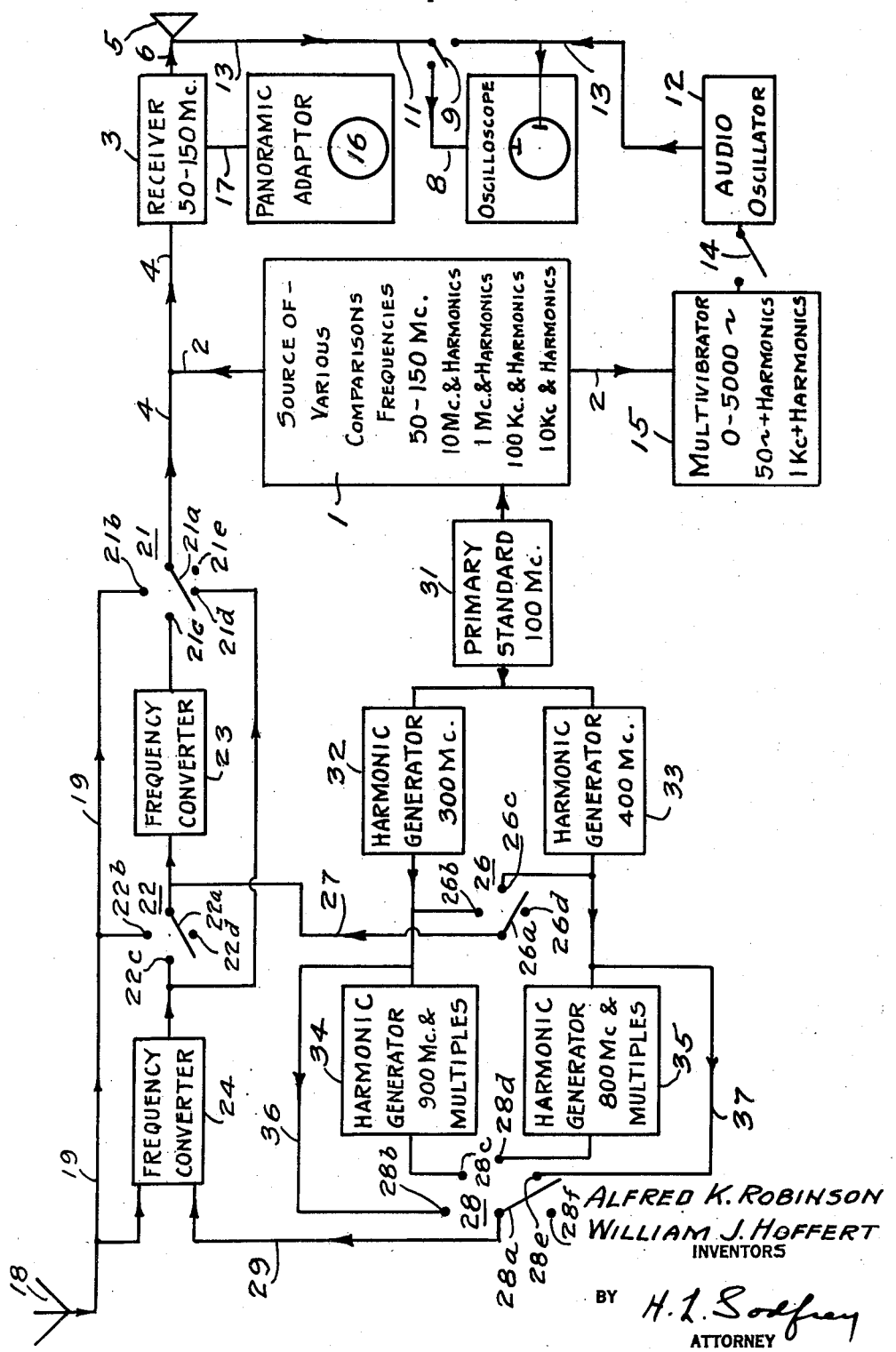
ALFRED K. ROBINSON
WILLIAM J. HOFFERT
INVENTORS
BY H. L. Godfrey
ATTORNEY Patented June 16, 1953

2,642,534

UNITED STATES PATENT OFFICE 2,642,534

MULTIPLE STANDARD INVERSION FREQUENCY MEASURING SYSTEM

Alfred K. Robinson, Newport Beach, and William J. Hoffert, Santa Ana, Calif.

Application April 23, 1951, Serial No. 222,515

5 Claims. (Cl. 250—39)

(Granted under Title 35, U. S. Code (1952), sec. 266)

The invention described herein many be manufactured and used by or for the Government of the United States for governmental purposes without the payment to us of any royalty thereon in accordance with the provisions of the act of April 30, 1928 (ch. 460, 45 Stat. L. 467).

This invention relates to means for and methods of measuring frequencies.

It is an object of this invention to provide means for and methods of accurately and easily measuring frequencies in the very high frequency and higher frequency ranges.

This object is accomplished in accordance with this invention by reducing the unknown frequency by known intervals until the signal is reduced to a point where it can be conveniently compared with a known multiple of a low frequency signal.

The invention may be clearly understood by referring to the following description and accompanying drawings, wherein the single figure is a block diagram of a preferred embodiment of the invention.

In a preferred embodiment of the invention illustrated in the drawing, a conventional means for measuring frequencies in the 50-150 mc. range is provided. This means may take the form of a source 1 of various comparison frequencies connected by a line 2 to a 50-150 mc. heterodyne receiver 3 with a beat frequency oscillator. The receiver is further adapted to receive unknown frequencies in the 50-150 mc. range through a line 4.

The source 1 of various comparison frequencies comprises conventional harmonic generators, multivibrators and amplifiers. The source receives an input of known accuracy so that the frequency of its output is of known accuracy. The output of the source of comparison frequencies may take any one of four forms. It may be a signal composed principally of a 10 mc. frequency and harmonics thereof from 50 to 150 mc. It may be a signal of 1 mc. and harmonics thereof from 50 to 150 mc. Or it may be 100 kc. and harmonics thereof, or 10 kc. and harmonics thereof, from 50 to 150 mc.

Means may be provided for aural observation of the audio output of the receiver 3 in the form of a speaker 5 connected to the receiver 3 by a line 6. Also, means may be provided for visual observation of the audio output of the receiver 3 in the form of an oscilloscope 7 connected to the receiver 3 by a line 8, a switch 9, a line 11, and the line 6.

A variable audio comparison frequency may be provided by an audio oscillator 12 with its output connected to the oscilloscope 7 by a line 13 and to the speaker 5 by line 13, switch 9, line 11, and line 6.

The audio oscillator 12 may be connected by a switch 14 to a 0 to 5000 c. p. s. multivibrator 15 which has alternative outputs of 1 kc. and harmonics thereof, and 50 c. p. s. and harmonics thereof. The multivibrator 15 is controlled by a signal from the source of various comparsion frequencies 1, and provides accurate frequency reference points to facilitate checking of the calibration on the audio oscillator 12.

A convenient alternative embodiment of the invention may have a panoramic adapter 16 connected by a line 17 to the intermediate frequency of the receiver 3.

Several alternative paths are provided for feeding an unknown signal in its original or modified forms to the receiver 3. The original unknown may be received by an antenna 18 and fed by a line 19 through a switch 21 and the line 4 to the receiver 3. Alternatively the original unknown may be fed from the line 19 through a switch 22 to a first frequency converter 23. The output of the frequency converter 23 is a modified unknown which is fed through the switch 21 and line 4 to the receiver 3.

Still another path for the unknown is provided from the antenna 18 directly to a second frequency converter 24. The output of the second frequency converter 24 is connected to the switch 22 and by a line 25 to the switch 21. By operation of the switches 21 and 22, the output of the second frequency converter 24 may be fed either through the first frequency converter 23 to the receiver 3 or directly to the receiver 3.

The switch 21 is provided with one movable contact 21a which is connected to the line 4, and with four stationary contacts 21b, 21c, 21d and 21e. The stationary contact 21b is connected to the line 19. The stationary contact 21c is connected to the output of the first frequency converter 23 and the stationary contact 21d is connected by the line 25 to the output of the second frequency converter 24. The fourth stationary contact 21e indicates the open position of the switch 21.

Similarly, the switch 22 is provided with a movable contact 22a which is connected to one input of the first frequency converter 23 and with three stationary contacts 22b, 22c and 22d. The stationary contact 22b is connected through the line 19 to the antenna 18 and the stationary contact 22c is connected directly to the output of the second frequency converter 24. The third stationary contact 22d indicates the open position of the switch 22.

Fixed comparison signals of various frequencies are fed to the first and second frequency converters 23 and 24 through a switch 26 and a line 27, and a switch 28 and a line 29, respectively. The switch 26 is provided with a movable contact 26a which is connected to the line 27 and with three stationary contacts 26b, 26c, and 26d. The switch 28 is provided with a movable contact 28a and with five stationary contacts 28b, 28c, 28d, 28e and 28f.

The source of the fixed comparison frequencies which are fed to the frequency converters 23 and 24 may conveniently take the form of a primary standard 31 with a 100 kc. output and four harmonic generators 32, 33, 34 and 35 controlled by the primary standard 31 and with outputs of 300 mc., 400 mc., 900 mc. and harmonics thereof, and 800 mc. and harmonics thereof, respectively.

The first frequency converter 23 may receive a fixed comparison frequency of 300 mc. by means of the line 27, the movable switch contact 26a, and the stationary switch contact 26b which is connected to the output of the 300 mc. harmonic generator 32. The first frequency converter 23 may also receive a fixed comparison frequency of 400 mc. by means of the line 27, movable contact 26a, and stationary contact 26c which is connected to the output of the 400 mc. harmonic generator 33. The stationary contact 26d indicates the open position of the switch 26.

The second frequency converter 24 may receive a fixed comparison frequency of 300 mc. by means of the line 29, the movable contact 28a and the stationary contact 28b which is connected to the output of the 300 mc. harmonic generator 32 by a line 36. The second frequency converter 24 may also receive a fixed comparison frequency of 900 mc. and harmonics thereof by means of the line 29, movable contact 28a and the stationary contact 28b which is connected to the output of the harmonic generator 34. The stationary contact 28d which is connected to the output of the harmonic generator 35 and the stationary contact 28e which is connected by a line 37 to the output of the 400 mc. harmonic generator 33 provide means for feeding fixed comparison frequencies of 800 mc. and harmonics thereof, and 400 mc. to the second frequency converter 24 through the movable contact 28a and the line 29. The stationary switch terminal 28f indicates the open position of the switch 28.

The frequencies of the four harmonic generators 32, 33, 34 and 35 being multiples of the primary standard 31, are of the same percentage accuracy as the primary standard 31. The source of the various comparison frequencies 1 for the 50–150 mc. frequency measurement range is also controlled by the primary standard 31.

It will be immediately apparent to all persons skilled in the art that amplifiers and tuners not specifically mentioned in this description may be desirable additions to the circuit. Since an understanding of the invention does not require specific description of such instruments, they have been omitted in the interest of simplicity.

To measure frequencies in the range of 50–150 mc., the movable switch contacts 21a and 22a are closed on terminals 21b and 22d. With this connection a signal of unknown frequency appearing on the antenna 18 is mixed with the output of the source of various comparison frequencies 1, and the resulting difference frequency is determined by the receiver 3.

Frequency determination to the nearest 10 mc. can be made by the receiver 3 with the instrument 31 and instrument 1 set to put out 10 mc. and harmonics thereof. The receiver is tuned with the beat frequency oscillator on to the unknown and then to each of the two adjacent comparison frequency harmonics. The receiver dial is sufficiently accurate to determine the frequency of the two harmonics which are known to be multiples of 10 mc. The change in the dial setting of the receiver when tuning from the unknown to the lower adjacent comparison harmonic, as compared to the change in the dial setting of the receiver when tuning from the unknown to the higher adjacent comparison harmonic, will provide a good estimate of the unknown.

Comparison frequencies of 1 mc. and harmonics thereof are then applied to the receiver 3. By tuning from the 10 mc. point already determined to the unknown, and counting the 1 mc. points which are passed during that tuning, the unknown can be determined to the nearest 1 mc. In like fashion, with the instrument set to put out 100 kc. and harmonics thereof, and then 10 kc. and harmonics thereof, determination to the nearest 10 kc. can be made. It will then be possible to turn off the beat force oscillator and obtain an audio signal of 5000 cycles or less which can be observed aurally from the speaker 5 or visually on the oscilloscope 7.

The audio output of the receiver 3 is beat against the variable output of the audio oscillator 12 until a zero beat is obtained, and the frequency of the signal read on the audio oscillator dial. Alternatively, the audio output of the receiver 3 is applied to one set of plates on the oscilloscope 7 and the variable output of the audio oscillator 12 is applied to the other. The audio oscillator is varied until the pattern on the oscilloscope screen becomes round, and the frequency of the audio signal is read from the audio oscillator dial. The frequency of this audio signal, when algebraically added to the known frequency of the comparison harmonic adjacent the unknown indicates the frequency of the unknown signal applied to the receiver 3 through line 4.

To measure an unknown in a 150–250 mc. band, the switches in the circuit are set as follows: movable contact 21 is closed on stationary contact 21c; movable contact 22a is closed on stationary contact 22b; movable contact 26a is closed on stationary contact 26b; and movable contact 28a is closed on stationary contact 28f. The unknown is fed from the antenna 18 through the line 19 and the switch 22 to the frequency converter 23.

A 300 mc. signal is fed to the same frequency converter through switch 26 and line 27. The output of the frequency converter 23 is the difference between the 300 mc. signal and the unknown—a difference which necessarily falls within the 50–150 mc. range which can be measured by the receiver 3 as previously described. The original unknown at the antenna 18 is the algebraic sum of 300 mc. and the frequency determined by the receiver 3.

Frequencies in the range of 250–350 mc. are measured in a similar manner using the 400 mc. harmonic generator 33 by setting movable contact 26a at 26c instead of 26b. Unknowns in the range 350–450 mc. band can be measured with exactly the same switch settings that were used for the 150–250 mc. range, since the difference between the unknown and the 300 mc. signal will still be in the 50–150 mc. range of the receiver 3. Similarly, frequencies in the 450–550 mc. band may be measured with switch settings like those used in measuring the 250–350 mc. band.

To measure frequencies in the 550–650 mc. band, both the 300 mc. and the 400 mc. harmonic generators are used. The switches are set at 21c, 22c, 26b and 28e. The unknown is fed directly to the frequency converter 24 where it is mixed with the 400 mc. signal from the harmonic generator 33. One component of the output of the frequency converter 24 will be 400 mc. lower than the unknown signal at the antenna 18. That output is then fed to the frequency converter 23 through switch 22 where it is mixed with the signal from the 300 mc. harmonic generator. An additional 300 mc. is subtracted from the unknown. The resultant output of the frequency converter 23 will be within the 50–150 mc. range of the receiver 3.

The range of measurements can be extended to the 1350–1450 band by heterodyning the 800 and 900 mc. signals in the frequency converter 24 and the 300 and 400 mc. signals in the frequency converter 23.

To measure frequencies in the range 1450 mc.–1550 mc. the 800 mc. harmonic generator 44 is used alone, and the second harmonic or 1600 mc. output is used as the comparison frequency in the frequency converter 24. The difference signal falls within the 50–150 mc. range which can be measured by the receiver 3. There is, of course also a difference signal resulting from beat with the 800 mc. signal, but since that difference is not in the 50–150 mc. range, accurate measurement by the receiver 3 is not affected.

The following table will indicate switch settings and heterodyning frequencies for measurements up to 4150 mc.

| Signal Frequency Range, Mc. | Second Converter Heterodyning Freq., Mc. | Output to First Converter | First Converter Heterodyning Freq., Mc. | Output to Receiver, Mc. | Switch Positions | | | |
|---|---|---|---|---|---|---|---|---|
| | | | | | 21 | 22 | 26 | 28 |
| 50–150 | | | | | b | d | d | f |
| 150–250 | | | 300 | 150–50 | c | b | b | f |
| 250–350 | | | 400 | 150–50 | c | c | b | f |
| 350–450 | | | 300 | 50–150 | c | b | b | f |
| 450–550 | | | 400 | 50–150 | c | c | b | f |
| 550–650 | 300 | 250–350 | 400 | 150–50 | c | b | c | e |
| 650–750 | 800 | | | 150–50 | d | d | d | d |
| 750–850 | 900 | | | 150–50 | d | d | d | c |
| 850–950 | 800 | | | 50–150 | d | d | d | d |
| 950–1,050 | 900 | | | 50–150 | d | d | d | c |
| 1,050–1,150 | 800 | 250–350 | 400 | 150–50 | c | c | d | c |
| 1,150–1,250 | 900 | 250–350 | 400 | 150–50 | c | c | c | c |
| 1,250–1,350 | 900 | 350–450 | 300 | 50–150 | c | b | c | c |
| 1,350–1,450 | 900 | 450–550 | 400 | 50–150 | c | c | c | c |
| 1,450–1,550 | 1,600 | | | 150–50 | d | d | d | d |
| 1,550–1,650 | 1,800 | 250–150 | 300 | 50–150 | c | b | c | c |
| 1,650–1,750 | 1,800 | | | 150–50 | d | d | d | c |
| 1,750–1,850 | 1,600 | 150–250 | 300 | 150–50 | c | b | c | d |
| 1,850–1,950 | 1,800 | | | 50–150 | d | d | d | c |
| 1,950–2,050 | 1,600 | 350–450 | 300 | 50–150 | c | b | c | d |
| 2,050–2,150 | 1,600 | 450–550 | 400 | 50–150 | c | c | c | d |
| 2,150–2,250 | 1,800 | 350–450 | 300 | 50–150 | c | b | c | c |
| 2,250–2,350 | 1,800 | 450–550 | 400 | 50–150 | c | c | c | c |
| 2,350–2,450 | 2,700 | 350–250 | 400 | 50–150 | c | c | c | c |
| 2,450–2,550 | 2,400 | | | 50–150 | d | d | d | d |
| 2,550–2,650 | 2,700 | | | 150–50 | d | d | d | c |
| 2,650–2,750 | 2,400 | 250–350 | 400 | 150–50 | c | c | c | d |
| 2,750–2,850 | 2,700 | | | 50–150 | d | d | d | c |
| 2,850–2,950 | 2,700 | 150–250 | 300 | 150–50 | c | b | c | d |
| 2,950–3,050 | 2,700 | 250–350 | 400 | 150–50 | c | c | c | c |
| 3,050–3,150 | 3,200 | | | 50–150 | d | d | d | d |
| 3,150–3,250 | 2,700 | 450–550 | 400 | 50–150 | c | c | c | c |
| 3,250–3,350 | 3,200 | | | 50–150 | d | d | c | d |
| 3,350–3,450 | 3,200 | 150–250 | 300 | 150–50 | c | b | c | d |
| 3,450–3,550 | 3,600 | | | 150–50 | d | d | d | c |
| 3,550–3,650 | 3,200 | 350–450 | 300 | 50–150 | c | b | c | d |
| 3,650–3,750 | 3,600 | | | 50–150 | d | d | d | c |
| 3,750–3,850 | 3,600 | 150–250 | 300 | 150–50 | c | b | c | c |
| 3,850–3,950 | 3,600 | 250–350 | 400 | 150–50 | c | c | c | c |
| 3,950–4,050 | 3,600 | 350–450 | 300 | 50–150 | c | b | c | c |
| 4,050–4,150 | 3,600 | 450–550 | 400 | 50–150 | c | c | c | c |

It should be noted, however, that the use of this system is not limited to 4150 mc. Any frequency up to infinity may be measured by the system simply by using higher harmonics of the 800 and 900 mc. signals.

The inexperienced operator may find it convenient to use a broad tuning receiver (not shown) with a frequency range of 50–4000 mc. or higher to assist in identifying approximately the frequency of the unknown signal so that he may know what combination of switch settings is required and what side band of what harmonic he is using. Experienced operators will be able to make such determinations by manipulation of tuning circuits in the frequency converters, by substitution for momentary observation of a primary standard which is slightly above or below 100 kc., or by other similar operations familiar to those in the art.

When study is being made of a weak or intermittent signal, it is often desirable to use a substitution oscillator (not shown) in the 50–150 mc. range in lieu of the unknown signal fed to the receiver 3 through line 5.

Use of this invention reduces the unknown to an easily handled frequency before actual measurements are made, thus avoiding the difficult and sometimes impossible problem of obtaining a zero beat between two ultra high frequency or higher signals. This invention also avoids the problem of determining which 10 kc. harmonic in the U. H. F. or higher range is the one at which zero beat has been obtained. Since primary standards are available many thousands of times more accurate than variable oscillators, this invention permits frequency determinations of an accuracy not possible with variable oscillator systems.

It will be understood that the embodiment shown and described is purely illustrative and that modifications may be made therein without departing from the spirit and scope of the invention as set forth in the appended claims.

What is claimed is:

1. A method of measuring frequencies comprising the steps of providing a primary standard frequency, producing a certain selected multiple of said primary standard frequency, mixing said multiple with an original unknown signal whose frequency is to be determined to provide a converted frequency differing from said original unknown frequency by the amount of said selected multiple frequency, providing a source of multiple frequencies and sub-multiple frequencies of said primary standard frequency, applying said converted frequency and one of the frequencies from said source to a tunable receiver having means for indicating beats.

2. The method of claim 1 in which the converted frequency is successively compared with selected frequencies of different orders from said source to determine the frequency of said converted frequency.

3. In a frequency measuring device, a source of primary standard frequency, a harmonic generator controlled by said primary standard frequency for providing a selected multiple of said primary standard frequency, converting means connected to said harmonic generator and to a source of unknown frequency for converting said unknown frequency into a converted frequency differing from said unknown frequency by the amount of said selected multiple frequency, a harmonic source controlled by said primary standard frequency for providing a selected harmonic, tunable receiver means for indicating beats between two applied frequencies, means for applying said converted frequency and said selected harmonic to said receiver means.

4. The combination of claim 3 in which a plurality of harmonic generators are provided each being controlled by said primary standard frequency and each of which generates a different multiple of said primary standard frequency and in which switch means are provided for connecting a selected harmonic generator to said converter means.

5. The combination of claim 3 in which a second converting means and a plurality of harmonic generators are provided, the harmonic generators each being controlled by said primary standard frequency, in which switch means are provided to permit a selected harmonic generator to be connected to a selected converting means, and in which a selectively operable switch means is provided to connect the first mentioned converter to the receiver means through the second converting means.

ALFRED K. ROBINSON.
WILLIAM J. HOFFERT.

References Cited in the file of this patent
UNITED STATES PATENTS

| Number | Name | Date |
|---|---|---|
| 1,982,340 | Forbes | Nov. 27, 1934 |
| 2,539,673 | Peterson | Jan. 30, 1951 |